Patented June 16, 1942

2,286,472

UNITED STATES PATENT OFFICE 2,286,472

BEARING SEAL

Thomas C. Delaval-Crow, Bristol, Conn., assignor to General Motors Corporation, Detroit, Mich., a corporation of Delaware Application June 26, 1940, Serial No. 342,412

3 Claims. (Cl. 286—5)

This invention relates to seals, and more particularly to a bearing seal which prevents the loss of lubricant from a bearing and which also prevents water and other deleterious matter from entering the bearing.

An object of this invention is to provide an improved seal of simple construction and which may be easily assembled in unit-handling sealing relation with an antifriction bearing.

Another object is to provide a seal which need not be constructed within close limits of accuracy and which will easily maintain an effective sealing relation even under conditions of misalignment of the bearing parts.

A further object is to construct such a seal from parts that may be easily blanked out from strip materials and then bent to operative shape.

To these ends, and also to improve generally upon devices of the character indicated, my invention consists in the various matters hereinafter described and claimed.

Generally stated, my sealing device, as S, includes a two-part casing secured to one of a pair of relatively rotatable annularly spaced members as the race rings of an antifriction bearing, and a resilient sealing washer W, which normally tends to assume the planar form of a flat disc that is very thin as compared to its diameter, is axially sprung into a laterally C-shaped, or parti-toric contour and confined in this curved as dished shape in an annular casing groove 12 that opens onto the other race ring. The radial width of the washer W greatly exceeded the radial depth of the groove 12 so that the washer in sealing position will laterally extend through a considerable curvature having a uniformly convexed radial section. The inherent resiliency of the washer W, which is freely movable in the groove 12, urges this washer W into yieldable capillary sealing contact with the race ring, and the resiliency of this washer facilitates a highly efficient sealing contact even if the race rings of the bearing should become located out of their normal coaxial relation. Whenever the race rings out of their normal coaxial alignment, the washer W will bodily move and flex throughout its entire radial depth. Also, the freedom of movement and inherent resiliency of the washer W obviates the necessity of providing exactly constructed and precision assembled parts in my sealing device.

Figures 1, 2:
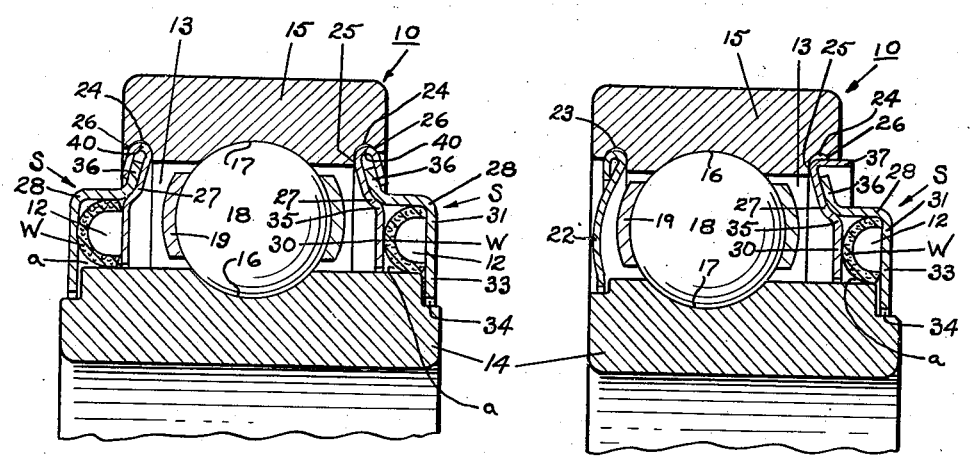
Figure 1 is a fragmentary view in diametrical section showing a ball bearing equipped with my seal.
Figure 2 is a sectional view showing the parts of my seal in position to be mounted in unit-handling sealing relation with the ball bearing.

Referring to the drawing, my seal S is shown in unit-handling relation with a unit-handling antifriction bearing 10 and sealingly closing one or both ends of an annular lubricant chamber 13 between the inner and outer race rings 14 and 15 that are respectively provided with the raceways 16 and 17 in which run the rolling elements, such as the balls 18 spaced by a separator 19. In Figure 1 I have employed the similar seals S closing each end of the lubricant chamber, and in Figures 2 and 4 my seal is only shown at one end of the bearing while the other end of the lubricant chamber is closed by a suitable shield 22 in the form of a metal washer that has a curled-over peripheral edge seated in an annular groove 23 in the outer race ring 15.

Each casing is mounted in an internally peripheral groove 24 near the end of the outer race ring, and this groove 24 has the divergent side walls 25 and 26, this inner wall 25 forming a deep annular shoulder. The casing includes the inner and outer offset washers 27 and 28 that may be stamped out from suitable ductile sheet metal and bent to form, and these washers are respectively dished at 30 and 31 to provide the casing with spaced side walls and a peripheral wall defining the annular groove 12 which opens inwardly onto the inner race ring 14. A flat side wall 33 of the outer washer 28 extends into the edge recess 34 in the end of the inner race ring 14 to provide a labyrinth and the dished portion 30 of the inner washer 27 forms a locating shoulder 35 over which fits the flange 36 on the outer disc 28. The inner washer 27 is provided before assembly with a laterally disposed flange 37 of such a diameter that this washer may be positioned against the shoulder 25. During assembly of the seal parts and after the outer washer 28 is mounted in position, the flange 37 is bent over from the position of Figure 2 to the position of Figure 1 into rigid clamping engagement with the flange 36, and this bending-over provides on the washer 27 a peripheral rib 40 that wedges tightly in sealing contact with the sides of the groove 24 and which firmly secures the seal casing in unit-handling relation with the antifriction bearing.

Figure 3:
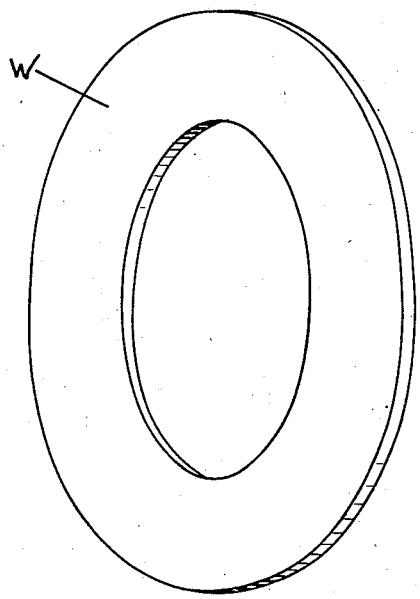
Figure 3 is a perspective view of the sealing washer before it is deformed into sealing position.

The sealing washer W is preferably cut from a sheet of suitable material such as a substantially lubricant impervious fibrous material of uniform thickness that is inherently springy so that the sealing washer W will always tend to return to its initially flat form as shown in Figure 3. This sealing washer W is sufficiently thin to provide a freely movable, yieldable seal that will always resiliently deform into capillary race ring wiping contact, and even under conditions of misalignment of the race rings 14 and 15. As illustrated in Figures 1, 2 and 3, the resiliency of the convexed washer W urges the outer washer periphery into yieldably movable sealing engagement against the bottom of the groove 12, and urges the inner washer periphery into yieldably movable capillary sealing engagement with the seal engaging face on the inner race ring. Also, this convexed deformation of the sealing washer W locates the inner and outer terminal edges of the washer W against one of the side casing walls while the mid portion of the convexed washer is pressed into movable contact with the other side casing wall. As shown in Figure 1, the sealing washer W may be assembled in reversed position if it is desired to reverse the capillary angle a.

Figure 4:
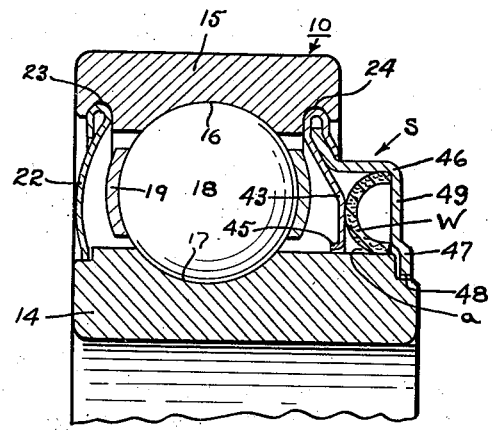
Figure 4 is a sectional view showing another embodiment of my sealing device mounted in a ball bearing.

The embodiment shown in Figure 4 is generally similar to the structure of Figure 1 except that the inner casing washer 43 has a reinforcing flange 45 adjacent the inner race ring 14 and the outer casing washer 46 has an annular stepped portion 47 that extends into the edge recess 48 and forms a labyrinth at the outer end of the race ring. The annular side wall 49 of the washer 46 surrounds the race ring 14 inwardly of the recess 48 and provides a seal-locating abutment which positions the sealing portion of the sealing washer W well in beyond the outer end of the race ring 14.

I claim:

1. In a sealing device for closing the annular space between two relatively rotatable members, a seal engaging face on one of said members, a casing secured to said other member and forming an annular groove opening towards said seal engaging face, an inherently flat and flexible resilient sealing washer of uniform thickness axially deformed to a convexed radial section and compressibly confined by said groove for bodily and yieldable movement in said groove, said convexed washer being supportably engaged only adjacent its inner and outer peripheries and along a mid portion of its convexed section, and the resiliency of the washer urging the washer peripheries respectively into relatively movable sealing engagement with the bottom of said groove and into relatively movable sealing contact with said seal engaging face.

2. In a sealing device for closing the annular space between two relatively rotatable members, a seal engaging face on one of said members, a casing secured to said other member and having two spaced side walls and forming an annular groove opening towards said seal engaging face, an inherently flat and flexibly resilient sealing washer of uniform thickness, said washer being axially deformed into a uniformly curved radial section and compressibly confined to said deformed condition for bodily and yieldable movement in said groove, the washer having a convexed side face slidably contacting one of said side walls only along a mid portion of the deformed washer, outer and inner terminal washer edges in yieldable lateral contact with said other side wall, and said convexed side washer face having peripheries respectively urged by the resiliency of said washer into relatively movable yieldable engagement with the bottom of said annular groove and into relatively movable yieldable sealing contact with said seal-engaging face.

3. In a sealing device for closing the annular space between two relatively rotatable members, a seal engaging face on one of said members, a casing secured to said other member and having two spaced side walls and a peripheral wall forming an annular groove opening towards said seal engaging face, an inherently flat and flexibly resilient sealing washer of uniform thickness and having a radial width exceeding the radial depth of said groove, the washer being axially deformed into a uniformly convexed radial section and compressibly received in said groove for bodily and yieldable movement, the washer having a convexed side face slidably and yieldably engageable with one of said side walls only along a mid portion of said convexed side face, outer and inner terminal washer edges in slidable and lateral contact with said other side wall, said convexed washer face having an outer periphery yieldably and movably engageable with the peripheral casing wall, and said convexed washer face having an inner periphery urged by the resiliency of said washer into a freely yieldable capillary sealing relation with said seal engaging face.

THOMAS C. DELAVAL-CROW.